(12) United States Patent
Fontana et al.

(10) Patent No.: US 9,936,328 B2
(45) Date of Patent: Apr. 3, 2018

(54) APPARATUS AND METHOD FOR ESTIMATING AN OVERALL MIXING TIME BASED ON AT LEAST A FIRST PAIR OF ROOM IMPULSE RESPONSES, AS WELL AS CORRESPONDING COMPUTER PROGRAM

(71) Applicant: Huawei Technologies Co., Ltd., Shenzhen (CN)

(72) Inventors: Simone Fontana, Munich (DE); Peter Grosche, Munich (DE); Panji Setiawan, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/268,874

(22) Filed: Sep. 19, 2016

(65) Prior Publication Data
US 2017/0006403 A1 Jan. 5, 2017

Related U.S. Application Data

(63) Continuation of application No. PCT/EP2014/055703, filed on Mar. 21, 2014.

(51) Int. Cl.
*H04R 5/00* (2006.01)
*H04S 7/00* (2006.01)
(Continued)

(52) U.S. Cl.
CPC .............. *H04S 7/305* (2013.01); *G01H 7/00* (2013.01); *H04S 1/005* (2013.01); *H04S 2400/01* (2013.01); *H04S 2420/01* (2013.01)

(58) Field of Classification Search
USPC .......... 381/1, 22, 23, 59, 103, 119, 303, 17, 381/71.8, 150, 300
See application file for complete search history.

(56) References Cited

U.S. PATENT DOCUMENTS

| 2005/0094821 | A1  | 5/2005 | Bharitkar et al. |
| 2005/0175193 | A1* | 8/2005 | Karjalainen ............. H04R 3/04 381/103 |

(Continued)

FOREIGN PATENT DOCUMENTS

| CN | 1953620 A | 4/2007 |
| CN | 101903948 A | 12/2010 |

(Continued)

OTHER PUBLICATIONS

Rubak, P., et al., "Artificial Reverberation based on Pseudo-random Impulse Response II," An Audio Engineering Society Preprint, May 8-11, 1999, 16 pages.

(Continued)

*Primary Examiner* — Yosef K Laekemariam
(74) *Attorney, Agent, or Firm* — Conley Rose, P.C.

(57) ABSTRACT

An apparatus for estimating an overall mixing time, where the apparatus comprises a processing element configured to determine differences between energy profiles of a first room impulse response of the first pair of room impulse responses and a second room impulse response of the first pair of room impulse responses at a plurality of different sample times of the first pair of room impulse responses, set a sample time of the plurality of sample times as a mixing time for the first pair of room impulse responses at which the difference between the energy profiles of the first room impulse response and the second room impulse response of the first pair of room impulse responses is equal to or below a threshold value, and determine the overall mixing time based on the mixing time for the first pair of room impulse responses.

17 Claims, 6 Drawing Sheets

(51) Int. Cl.
*G01H 7/00* (2006.01)
*H04S 1/00* (2006.01)

(56) References Cited

U.S. PATENT DOCUMENTS

| | | | |
|---|---|---|---|
| 2009/0052680 A1* | 2/2009 | Wang | H04S 7/305 381/59 |
| 2009/0164212 A1 | 6/2009 | Chan et al. | |
| 2011/0170721 A1 | 7/2011 | Dickins et al. | |
| 2014/0355796 A1* | 12/2014 | Xiang | H04S 7/305 381/303 |

FOREIGN PATENT DOCUMENTS

| | | |
|---|---|---|
| EP | 0641143 B1 | 12/2001 |
| EP | 2028884 A1 | 2/2009 |
| JP | 2009053694 A | 3/2009 |
| JP | 2012503943 A | 2/2012 |
| KR | 20090020813 A | 2/2009 |
| WO | 2014036121 A1 | 3/2014 |

OTHER PUBLICATIONS

Meesawat, K., et al., "The time when the reverberation tail in a binaural room impulse response begins," Audio Engineering Society, Convention Paper 5859, Oct. 10-13, 2003, 9 pages.
Abel, J., et al., "A Simple, Robust Measure of Reverberation Echo Density," Audio Engineering Society, Convention Paper 6985, Oct. 5-8, 2006, 10 pages.
Hidaka, T., et al., "A new definition of boundary point between early reflections and late reverberation in room impulse responses," J. Acoust. Soc. Am., vol. 122, No. 1, Jul. 2007, pp. 326-332.
Stewart, R., et al., "Statistical Measures of Early Reflections of Room Impulse Responses," Proc. of the 10th Int. Conference on Digital Audio Effects (DAFx-07), Sep. 10-15, 2007, 4 pages.
Defrance, G., et al., "Using Matching Pursuit for estimating mixing time within Room Impulse Responses," Mar. 29, 2009, 11 pages.
Lindau, A., et al., "Perceptual Evaluation of Model- and Signal-Based Predictors of the Mixing Time in Binaural Room Impulse Responses," J. Audio Eng. Soc., vol. 60, No. 11, Nov. 2012, pp. 887-898.
Primavera, A., et al., "Objective and Subjective Investigation on a Novel Method for Digital Reverberator Parameters Estimation," IEEE/ACM Transactions on Audio, Speech, and Language Processing, vol. 22, No. 2, Feb. 2014, pp. 441-452.
Jeub, M., et al., "A Binaural Room Impulse Response Database for the Evaluation of Dereverberation Algorithms," DSP, 2009, 5 pages.
"An Interdisciplinary Synthesis of Reverberation Viewpoints," 2017, 3 pages.
Jean-Marc, J., et al., "Analysis and synthesis of room reverberation based on statistical time-frequency model," Sep. 1997, 31 pages.
Defrance, G., et al., "Measuring the mixing time in auditoria," J. Acoust. Soc. Am., vol. 123, No. 5, 2008, pp. 3871-3876.
Foreign Communication From a Counterpart Application, Chinese Application No. 201480074930.X, Chinese Office Action dated Mar. 2, 2017, 8 pages.
Foreign Communication From a Counterpart Application, Chinese Application No. 201480074930.X, Chinese Search Report dated Feb. 13, 2017, 3 pages.
Foreign Communication From a Counterpart Application, PCT Application No. PCT/EP2014/055703, English Translation of International Search Report dated Nov. 20, 2014, 5 pages.
Foreign Communication From a Counterpart Application, PCT Application No. PCT/EP2014/055703, English Translation of Written Opinion dated Nov. 20, 2014, 6 pages.
Machine Translation and Abstract of Chinese Publication No. CN1953620, Sep. 5, 2006, 9 pages.
Foreign Communication From a Counterpart Application, Korean Application No. 2016-7027902, Korean Office Action dated Oct. 24, 2017, 6 pages.
Foreign Communication From a Counterpart Application, Korean Application No. 2016-7027902, English Translation of Korean Office Action dated Oct. 24, 2017, 5 pages.
Foreign Communication From A Counterpart Application, Japanese Application No. 2017-500132, Japanese Office Action dated Jan. 9, 2018, 3 pages.
Foreign Communication From A Counterpart Application, Japanese Application No. 2017-500132, English Translation of Japanese Office Action dated Jan. 9, 2018, 2 pages.

* cited by examiner

APPARATUS AND METHOD FOR ESTIMATING AN OVERALL MIXING TIME BASED ON AT LEAST A FIRST PAIR OF ROOM IMPULSE RESPONSES, AS WELL AS CORRESPONDING COMPUTER PROGRAM

CROSS-REFERENCE TO RELATED APPLICATION

This application is a continuation application of international patent application number PCT/EP2014/055703 filed on Mar. 21, 2014, which is incorporated by reference.

TECHNICAL FIELD

The present disclosure refers to an apparatus and a method for estimating an overall mixing time based on at least a first pair of room impulse responses (RIRs), as well as to a corresponding computer program comprising a program code for performing, when running on a computer, a method according to the present disclosure.

BACKGROUND

Multi-channel audio contents are nowadays more and more common in consumer electronics. Immersive audio is becoming a common feature in many multi-media and communication systems. However, immersive audio often requires a reproduction layout involving a great number of loudspeakers, as for example the 22.2 layout. This is a major constraint for products such as mobile devices (smart phones, tablets, etc.) as well as teleconferencing applications, home cinema applications, high fidelity (HI-FI) applications and so forth, which output audio signals with only two loudspeakers or headphones, where the signals are output in a left and a right audio output channel.

Binauralization, which is also called "virtual surround", is the binaural presentation of multi-channel audio signals to a listener using headphones, left/right loudspeakers or other transaural apparatus (binaural over loudspeakers). One way to carry out binauralization is to render each loudspeaker and the related feeding signal as a virtual source, that is binaurally filtering the feeding signal to obtain the perception of the real loudspeaker even using headphones. In order to binaurally render each loudspeaker and related feeding signal, the signal is filtered with binaural RIRs (BRIRs), corresponding to the position of the loudspeaker in a given room, wherein the BRIRs are determined and measured at the virtual listener position.

Generally, a RIR is the response of the room to the excitation of a point source, measured at one point. Typically, to measure the RIRs in a room, the room is excited with a loudspeaker and the response is measured using a microphone at different positions. The respective two channel response is called BRIR as explained in relation to FIG. 1 if the response to the excitation is measured with microphones mounted in the ears of a dummy head.

The BRIRs encode the transfer function between the respective loudspeaker and the two ears (left and right) of the listener.

Figure 1:
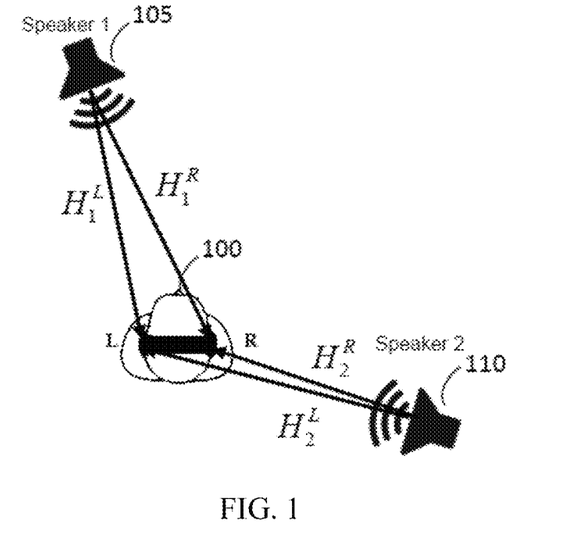
FIG. 1 shows a schematic example of a binaural filtering for two virtual speakers.

An example for the binaural filtering process is represented in FIG. 1, where $H_i^x$ represent the impulse response of the loudspeaker fed by the channel i signal to the X (X can be L for left or R for right) ear of the listener. The capital letter H stands for the frequency domain, while the small letter h stands for the time domain representation of the impulse response. As schematically shown in FIG. 1, the listener 100 is at a virtual position in the room and two loudspeakers 105 (speaker 1) and 110 (speaker 2) at respective different positions in the room emit audio waves, which are received by the left ear (L) and the right ear (R) of the user 100. As shown in FIG. 1, there is a pair of impulse responses H for each of the speakers 105, and 110.

The signal processing involved in binauralization can lead to a high computational complexity, especially for high quality applications. The complexity is related to the filtering of a multi-channel input signal with the binaural RIRs, BRIRs. In particular, using BRIRs which can easily exceed tens of thousands samples, the complexity can become extremely high. Furthermore, multi-channel architectures may consist of a high number of channels, such as for example 22 channels in the 22.2 speaker layout. (For the 2 Low Frequency Effect (LFE), channels typically a different processing is used as these do not contribute to the localization of sources).

Figure 2:
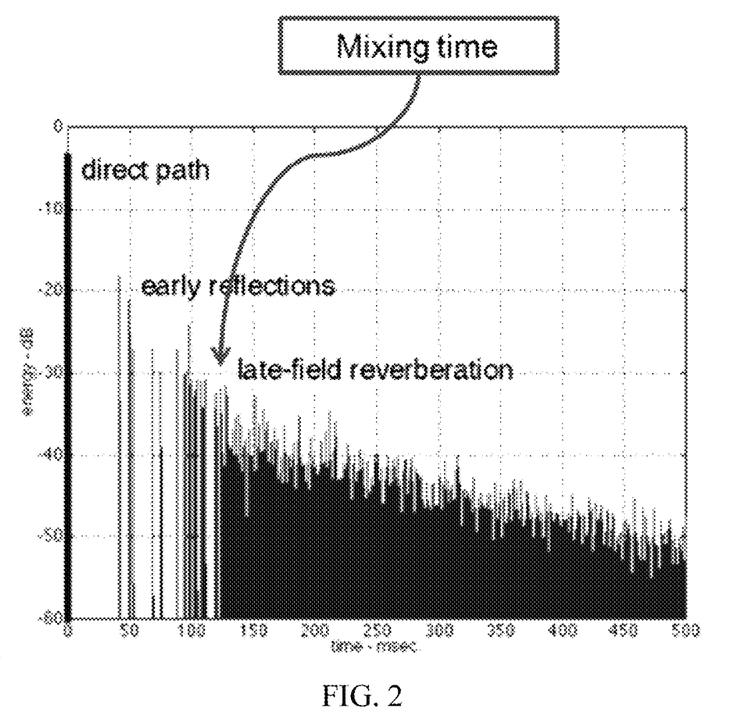
FIG. 2 shows an example of a RIR explaining the mixing time.

In order to reduce computational complexity for binauralization applications, an impulse response in a room is usually divided in two parts, which is also visualized in the reflectogram plot of an example RIR, shown in FIG. 2, namely into the direct path and early reflections (D&E) part and into the reverberation tail (late part). A different binauralization strategy is then used for the two parts.

Figure 3:
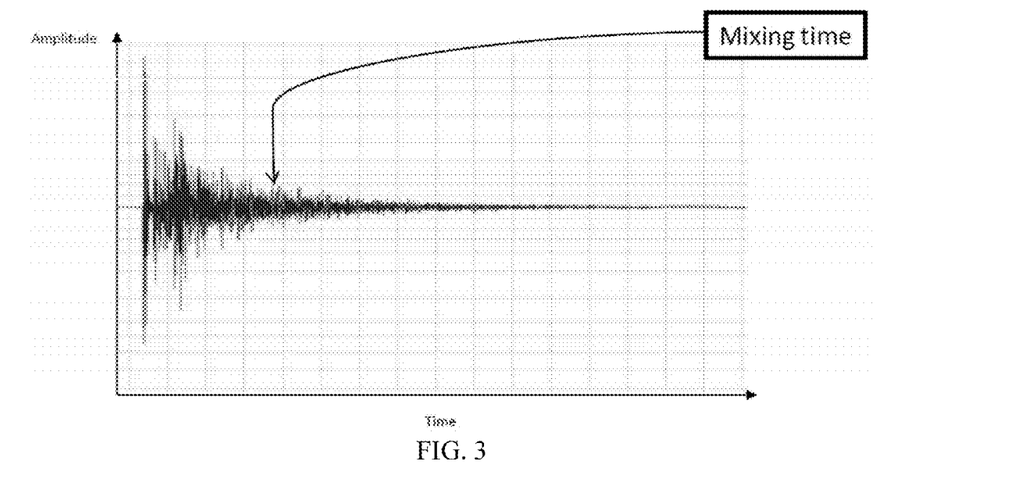
FIG. 3 shows an example of a RIR in a typical room.

The transition point between the D&E part and the late part is called mixing time. The mixing time can be expressed in an actual time value (e.g. nanosecond (ns), millisecond (ms), second (s)) or in a sample value representing a time point. In general we talk about a sample time which covers both expressions of the mixing time. The early reflections are a set of discrete reflections whose density increases until the individual reflections can no longer be discriminated or perceived. While the direct sound in the D&E part is a single event that can be easily identified, the early reflections and the late reverberation of an impulse response in a room are more difficult to distinguish and to label, as can be seen in the example of a RIR amplitude/time diagram shown in the example of FIG. 3.

The estimation and determination of the mixing time is a rather well studied topic in the prior art and several solutions are suggested.

The first groups of approaches are model-based methods, which assume that some prior knowledge of properties of the room exists such as the volume or geometry. Here, the mixing time is determined based for example on a threshold of the density of reflections in the room, or the threshold of a mean free path in the room. The reflections density and the mean free path can be mathematically related to some room properties such that the mixing time can be computed in closed form. The limitations and problems for the first group of approaches is that a prior knowledge of room properties is necessary. Typically, the results of these approaches are not very precise as they are not based on the real room but just on a model of the room. The quality of the results strongly depends on the quality of the model and the fitting of the real room to the model.

The second group of approaches uses a single measured RIR to estimate the mixing time. The second group of approaches is based on signal-based methods and uses threshold estimation, setting for example a threshold of (Gaussian) stochasticity, a threshold of memory, threshold of reflections detectability, threshold of phase randomness. The mixing time is then fixed at the time (or the sample) where a given metric is below or above the given threshold. The evaluation of these approaches, however, is problematic because there is no clear definition of the mixing time.

In order to have a meaningful reference, several prior art studies perform a perceptual analysis of RIRs in order to define a perceptual mixing time in subjective listening tests. Such studies typically exploit multiple RIRs measured in the same room at different positions. In some cases, model-based, signal-based estimators and perceptual estimations are merged using regression methods. Generally, the statistical approaches have limited consistency and deliver non-robust estimates of the mixing time. The statistical methods tend to provide a noisy detection curve so that applying a threshold on such curves is error-prone: small variations of the curve lead to large variations of the mixing time estimate. Furthermore, down-sampled subband domain representations of the RIRs or the BRIRs, obtained with techniques such as Quadrature Mirror Filter (QMF), are required for the Moving Picture Experts Group (MPEG) binauralization frame work. Signal-based algorithms have not been evaluated in such context so far. However, considering the limited robustness of full band RIRs, it is reasonable to assume that the performance will not be adequate in the down-sampled subband domain: shorter analysis windows may lead to a statistical inaccuracy (length of the window, typically 1024 samples, divided by a number of subbands, typically 64), changes in the fine structure passing from full band RIR to down-sampled subband RIR may lead to estimation inaccuracy.

SUMMARY

The object of the present disclosure is thus to provide a concept for estimating an overall mixing time based on at least a first pair of RIRs, which enables a robust mixing time estimation.

The above object is achieved by the solution provided in the enclosed independent claims. Advantageous implementations are defined in the respective dependent claims.

A first aspect of the present disclosure provides an apparatus for estimating an overall mixing time based on at least a first pair of RIRs. The apparatus comprises a processing element configured to determine differences between energy profiles of a first RIR of the first pair of RIRs and the second RIR of the first pair of RIRs at a plurality of different sample times of the first pair of RIRs, to set a sample time of the plurality of sample times as a mixing time for the first pair of RIRs at which the difference between the energy profiles of the first RIR and the second RIR of the first pair of RIRs is equal to or below a threshold value, and to determine the overall mixing time based on the mixing time for the first pair of RIRs.

The apparatus according to the first aspect of the present disclosure allows estimation the overall mixing time with an increased precision and robustness compared to the concepts described in the introductory part of this application.

In a first implementation form of the apparatus according to the first aspect of the disclosure, the apparatus is configured to estimate the overall mixing time based on a plurality of pairs of RIRs, the first pair of RIRs being comprised in the plurality of pairs of RIRs, and the processing element is further configured to determine, for each pair of impulse responses of the plurality of pairs of impulse responses, differences between energy profiles of a first RIR and of a second RIR of the respective pair of RIRs at a plurality of different sample times of the respective pair of RIRs, and set for each pair of RIRs of the plurality of pairs of impulse responses a sample time of the plurality of sample times as a mixing time for the respective pair of RIRs at which the difference between the energy profiles of the first RIR and the second RIR of the respective pair of RIRs is equal to or below a threshold value, and determine the overall mixing time based on the mixing times of each of the plurality of RIRs. This implementation provides a stable and robust estimation results for multi-channel systems. By having the possibility of deriving the overall mixing time based on a plurality of pairs of RIRs instead of only one pair of RIRs an even more robust detection of the mixing time can be achieved.

In a second implementation form of the apparatus according to the first implementation form of the first aspect of the disclosure, the processing element is further configured to determine the overall mixing time based on averaging over the mixing times of the plurality of pairs of RIRs. The solution provides an improved and more precise result for the overall mixing time.

In a third implementation form of the apparatus according to the first implementation form or the second implementation form of the first aspect of the disclosure, the processing element is further configured to weight at least for a part of the plurality of pairs of RIRs the determined mixing times, and to determine the overall mixing time based on the weighted mixing times. The solution provides a more reliable estimation result, as by weighting the mixing times the contributions of the pairs of RIRs to the estimation of the overall mixing time can varied (e.g. in dependence on recording the property of the pair of RIRs).

In a fourth implementation form of the apparatus according to the third implementation form of the first aspect of the present disclosure, the processing element is further configured to weight the mixing time of each pair of RIRs of the part of the plurality of RIRs based on first meta data associated to the first RIR of the respective pair of RIRs and based on second meta data associated to the second RIR of the respective pair of RIRs, the first meta data indicating a mutual relationship between a source and a receiver used for deriving the associated first RIR, the second meta data indicating a mutual relationship between a source and a receiver used for deriving the associated second RIR. This solution provides an enhanced accuracy of the estimation result, as by taking into account mutual relationships between the sources and the receivers of the associated it can be derived how reliable a certain pair of RIRs is for determining the mixing time. Therefore pairs of RIRs which are deemed to be unreliable can get a lower weight, while pairs of RIRs which are deemed to be reliable can get a higher weight.

In a fifth implementation form of the apparatus according to the first aspect as such or according to any of the previous implementation forms of the first aspect of the present disclosure, the processing element is further configured to calculate a backward integrated energy difference decay curve for determining said differences between the energy profiles. The solution provides additional accuracy and enhanced reliability of the result.

In a sixth implementation form of the apparatus according to the fifth implementation form of the first aspect of the present disclosure, the processing element is further configured to use a smoothed energy difference for calculating said backward integrated energy difference decay curve or to use a direct energy difference for calculating said backward integrated energy difference decay curve or to use an amplitude difference for calculating said backward integrated energy decay curve (EDC) or to use a level difference for calculating said backward integrated energy difference decay curve. These solutions provide advantageous and good quality estimation results.

In a seventh implementation form of the apparatus according to the first aspect as such or according to any of the previous implementation forms of the first aspect of the present disclosure, the processing element is configured to derive the difference between the energy profiles of the first impulse response and the second impulse response such that the difference is calculable by the expression:

$$DEDC[n] = \sum_{k=n}^{P} dh^2[k] = \sum_{k=n}^{P} |\tilde{h}_1^2[k] - \tilde{h}_2^2[k]|,$$

wherein differential energy decay curve (DEDC)[n] is the difference between the between the energy profiles of the first impulse response and the second impulse response at sample time n, $\tilde{h}_x^2$ is a temporally smoothed version of $h_x^2$, |•| refers to the absolute value, $h_1[k]$ is a value of the first RIR at sample time k, $h_2[k]$ is a value of the second RIR at sample time k and P is the length of the RIRs of the first pair RIRs. This solution is further advantageous in relation to the accuracy of the result.

In an eighth implementation form of the apparatus according to the first aspect as such or according to any of the previous implementation forms of the first aspect of the present disclosure, the processing element is configured to determine the first pair of impulse responses out of a corpus of available RIRs based on first meta data associated to the first RIR and second meta data associated to the second RIR, the first meta data indicating a mutual relationship between a source and a receiver used for deriving the first RIR and the second meta data indicating a mutual relationship between a source and a receiver used for deriving the second RIR. The solution provides a further enhanced quality of the estimation result.

In a ninth implementation form of the apparatus according to the first aspect as such or according to any of the previous implementation forms of the first aspect of the present disclosure, the processing element is further configured to determine the differences between the energy profiles of the first RIR and the second RIR at the plurality of different sample times for a plurality of sub-band partitions of the first pair of RIRs, and separately for each sub-band partition set the sample time of the plurality of sample times as the mixing time for the corresponding sub-band partition at which the difference between the energy profiles of the first RIR and the second RIR for the respective sub-band partition is equal to or below a threshold value, and determine the overall mixing time based on the mixing times for the plurality of sub-band partitions. This solution provides a robust and accurate estimate also in case a subband representation of the BRIR is given.

In a tenth implementation form of the apparatus according to the first aspect as such or according to any of the previous implementation forms of the first aspect of the present disclosure, the threshold value is either predetermined, or the processing element is configured to derive the threshold value based on meta data associated to the first pair of RIRs, the meta data indicating at least a property of a room based on which the first pair of RIRs were derived.

A second aspect of the present disclosure provides an audio decoder for decoding audio signals comprising an apparatus for estimating an overall mixing time based on at least a first pair of RIRs as defined in the first aspect as such or in any of the previous implementation forms of the first aspect of the present disclosure.

A third aspect of the present disclosure provides a method for estimating an overall mixing time based on at least a first pair of RIRs. The method comprises determining differences between energy profiles of a first RIR of the first pair of RIRs and a second RIR of the first pair of RIRs at a plurality of different sample times of the first pair of RIRs, setting a sample time of the plurality of sample times as a mixing time for the first pair of RIRs at which the difference between the energy profiles of the first RIR and the second RIR of the first pair of RIRs is equal to or below a threshold value, and determining the overall mixing time based on the mixing time for the first pair of RIRs.

In a second implementation form of the method according to the third aspect of the present disclosure, the first pair of RIRs is a binaural impulse response (comprising the first RIR (e.g. corresponding to a right ear recording position) and the second RIR (e.g. corresponding to a left ear recording position).

In a second implementation form of the method according to the third aspect as such or to the first implementation form, the method the overall mixing time is estimated based on a plurality of pairs of RIRs, the first pair of RIRs being comprised in the plurality of pairs of RIRs. The method comprises determining for each pair of impulse responses of the plurality of pairs of impulse responses differences between energy profiles of a first RIR and of a second RIR of the respective pair of RIRs at a plurality of different sample times of the respective pair of RIRs, and setting for each pair of impulse responses of the plurality of pairs of impulse responses a sample time of the plurality of sample times as a mixing time for the respective pair of RIRs at which the difference between the energy profiles of the first RIR and the second RIR of the respective pair of RIRs is equal to or below a threshold value, and determining the overall mixing time based on the mixing times of each of the plurality of RIRs.

In a third implementation form of the method according to the second implementation form, the method further comprises the steps of determining the overall mixing time based on an averaging over the mixing times of the plurality of pairs of RIRs.

In a fourth implementation form of the method according to the second or third implementation form, the method further comprises the steps of weighting at least for a part of the plurality of pairs of RIRs the determined mixing times, and determining the overall mixing time based on the weighted mixing times.

In a fifth implementation form of the method according to the third implementation form, the method further comprises to weighting the mixing time of each pair of RIRs of the part of the plurality of RIR based on first meta data associated to the first RIR of the respective pair of RIRs and based on second meta data associated to the second RIR of the respective pair of RIRs, the first meta data indicating a mutual relationship between a source and a receiver used for deriving the associated first RIR, the second meta data indicating a mutual relationship between a source and a receiver used for deriving the associated second RIR.

In a sixth implementation form of the method according to the third aspect as such or according to any of the preceding implementation forms of the third aspect, the method further comprises to use EDCs as said energy profiles and a backward integrated energy difference decay curve for determining said differences between the EDCs.

In a seventh implementation form of the method according to the fifth implementation form, the method further comprises to use a smoothed energy difference in the backward integrated energy difference decay curve or to use a direct energy difference in the backward integrated energy difference decay curve or to use an amplitude difference in the backward integrated energy difference decay curve or to use a level difference in the backward integrated energy difference decay curve.

In an eight implementation form of the method according to the third aspect as such or according to any of the preceding implementation forms of the third aspect, the method further comprises to derive the difference between the energy profiles of the first impulse response and the second impulse response such that the difference is calculable by the expression:

$$DEDC[n] = \sum_{k=n}^{P} dh^2[k] = \sum_{k=n}^{P} \left| \tilde{h}_1^2[k] - \tilde{h}_2^2[k] \right|,$$

wherein DEDC[n] is the difference between the between the energy profiles of the first impulse response and the second impulse response at sample time n, $\tilde{h}_x^2$ is a temporally smoothed version of $h_x^2$, |•| refers to the absolute value, $h_1[k]$ is a value of the first RIR at sample time k, $h_2[k]$ is a value of the second RIR at sample time k and P is the length of the RIRs of the first pair of RIRs.

In a ninth implementation form of the method according to the third aspect as such or according to any of the preceding implementation forms of the third aspect, the method further comprises to determine the first pair of impulse responses out of a corpus of available RIRs based on first meta data associated to the first RIR and second meta data associated to the second RIR, the first meta data indicating a mutual relationship between a source and a receiver used for deriving the first RIR and the second meta data indicating a mutual relationship between a source and a receiver used for deriving the second RIR.

In a tenth implementation form of the method according to the third aspect as such or according to any of the preceding implementation forms of the third aspect, the method further comprises to determine the differences between the energy profiles of the first RIR and the second RIR at the plurality of different sample times for a plurality of sub-band partitions of the first pair of RIRs, and separately for each sub-band partition set the sample time of the plurality of sample times as the mixing time for the corresponding sub-band partition at which the difference between the energy profiles of the first RIR and the second RIR for the respective sub-band partition is equal to or below a threshold value, and determine the overall mixing time based on the mixing times for the plurality of subband partitions.

In an eleventh implementation form of the method according to the third aspect as such or according to one of the preceding implementation forms of the third aspect, the threshold value is predetermined, or the method further comprises to derive the threshold value based on meta data associated to the first pair of RIRs, the meta data indicating at least a property of a room based on which the first pair of RIRs were derived.

A fourth aspect of the present disclosure provides a computer program comprising a program code for performing, a method according to the third aspect as such or according to any of the implementation forms of the third aspect of the present disclosure when running on a computer.

The above described first, second, third and fourth aspects of the present disclosure solve the above-described object in an advantageous way. Further advantageous but optional implementations are defined in the various above-described implementation forms. Generally, it has to be noted that all the arrangements, devices, elements, units and means and so forth described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of specific embodiments, a specific functionality or step to be performed by a general entity is not reflected in the description of a specific detailed element of that entity which performs that specific step or functionality, it should be clear for a skilled person that these methods and functionalities can be implemented in respective hardware or software elements, or any kind of combination thereof. Further, the methods of the present disclosure and its various steps are embodied in the functionalities of the various described apparatus elements.

BRIEF DESCRIPTION OF DRAWINGS

The above aspects and implementations of the present disclosure will be explained in the following description of specific embodiments in relation to the enclosed drawings, in which.

DESCRIPTION OF EMBODIMENTS

Figure 4:
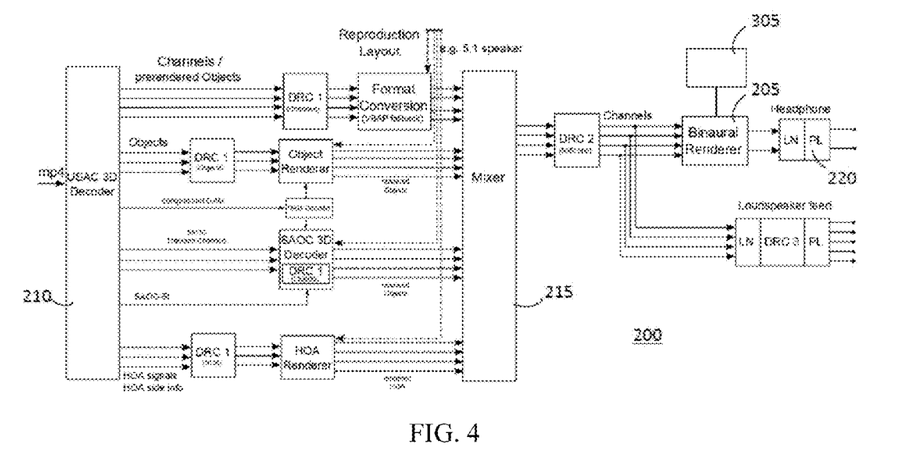
FIG. 4 shows a schematic block diagram of an MPEG-H three dimensional (3D) audio decoder with four channel audio content comprising an apparatus with a processing element according to an embodiment of the present disclosure.

FIG. 4 shows, as an implementation example of an apparatus according to an embodiment of the present disclosure, a schematic block diagram of a MPEG-H 3D audio decoder 200 for the example of a four channel audio content in order to visualize the location of a binaural renderer 205 in such an audio decoder. The various elements of the shown audio decoder 200 except the processing element 305, which will be explained below, correspond to common and known elements of an audio decoder of the MPEG standard, and a specific example the MPEG-H standard such that reference is made to the respective standard documents and a detailed description of each element is omitted.

However, as can be seen for the present four channel example of FIG. 4, a multi-channel audio signal, for example MPEG Layer-3 audio (mp3) or MPEG Layer-4 audio (mp4), is input to the decoder 210 of the MPEG-H 3D audio decoder 200, which decodes the signal to obtain a multi-channel audio signal, and after some further processing, the signals are mixed in a mixer 215 to the respectively required or designed number of output audio channels. In a binaural renderer 205, the four channels of this example are respectively filtered with a transfer function H as described in relation to FIG. 1 in order to obtain the binaural signal Ls and Rs which are then input to headphones 220 or the like. It is to be noted that embodiments of the present disclosure are not limited to the four channel example, and can be applied to any number of channels. Also, embodiments of the present disclosure are not limited to MPEG applications, as they can be implemented in other audio coding and binaural audio rendering environments.

In other words, although the embodiments of the present disclosure are described in this application using the example of the MPEG-H 3D audio decoder 200, the most single embodiment of the present disclosure can be formed by an apparatus comprising the processing element 305 which will be explained in the following.

There is a need for technologies to reduce the computational complexity in the binaural renderer 205 as shown in the example of FIG. 4, to keep the latency of the system under reasonable values and to deliver a high quality audio experience. In MPEG, a high quality yet low complexity binaural renderer has been developed which makes use of several techniques to reduce the complexity. One part of reducing the quality while keeping the highest possible quality is to separate the BRIRs into different parts and to apply a different filtering strategy for each of the different parts.

Figure 5:
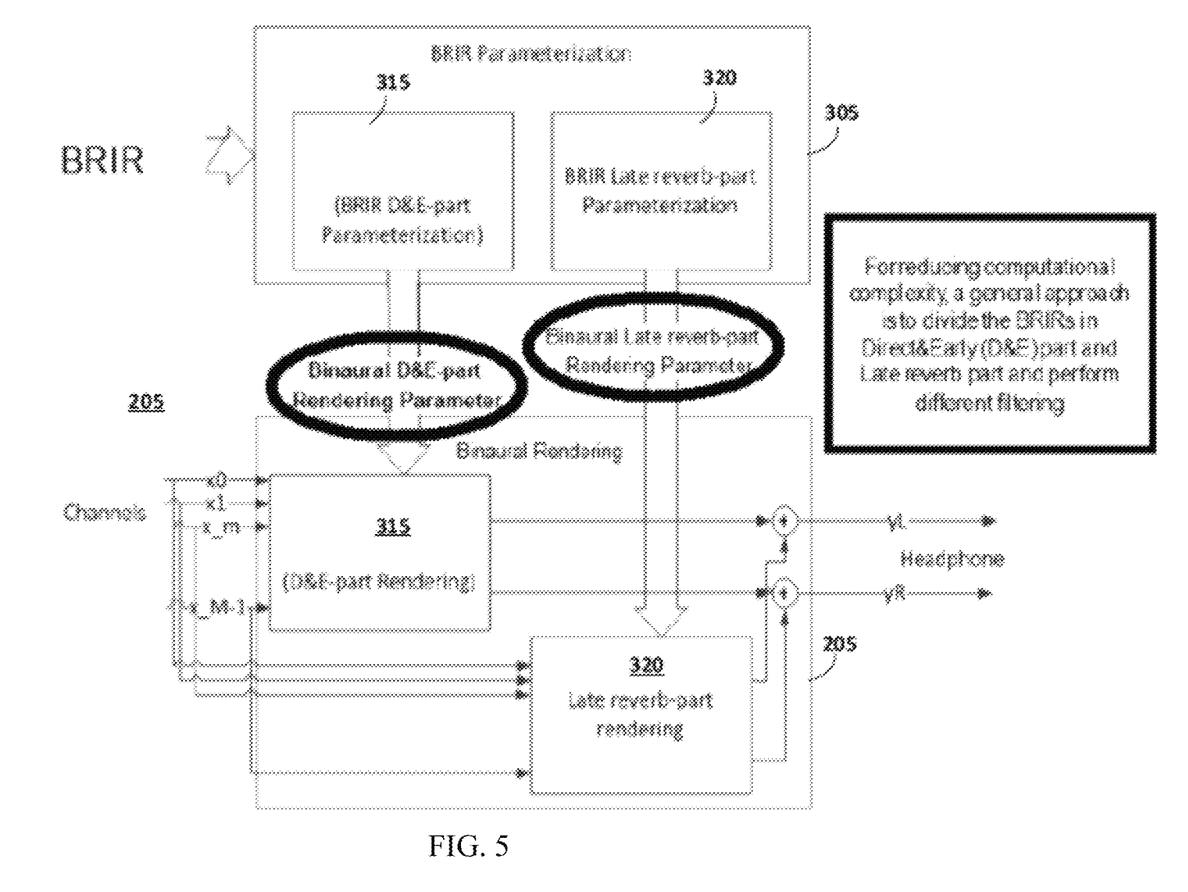
FIG. 5 shows a schematic block diagram of a binaural renderer of the audio decoder shown in FIG. 4 and a processing element according to an embodiment of the present disclosure.

FIG. 5 now shows a schematic block diagram of the elements of the binaural renderer 205 of the audio decoder shown in FIG. 4 as well as the processing element 305 according to an embodiment of the present disclosure. The processing element 305 is e.g. a BRIR parameterization element 305 as shown, which is connected to the binaural renderer 205. In the parameterization element 305, the respective BRIR is separated into a D&E part 315 and a late reverberation part 320. Subsequently, each of these two parts is filtered in the binaural renderer 205 in a different way. The D&E part 315, which is typically short, is filtered with the highest quality to achieve a good localization performance. The late reverberation part 320, however, which can be very long as it contains the reverberation of the room, is filtered with a lower resolution in the binaural renderer 205. While the late reverberation is a property of the room which in first approximation does not depend on the measuring position, the early part of the impulse responds, carrying the direct front and the early reflections, has to be modeled further and individually considering the position of the listener 100 and the speakers 105, 110 (reference is made to FIG. 1).

The D&E part 315 of the BRIR refers to a particular speaker and input channel, which means that each input channel has to be filtered with the corresponding early BRIR in order to provide realistic reproduction. On the other hand, the late reverberation part 320 does not depend on the specific position of the loudspeaker but is essentially the same for all positions within the respective room. Therefore, there is no need to filter each channel with the late reverberation part 320 of the respective BRIR. Instead, it is possible to filter each channel with the same late reverberation part 320. As a result, in the binaural renderer 205, the sum of all channels is directly filtered with the same late reverberation part 320. On the other hand, the D&E part 315 is individually filtered for each channel. Performing the filtering of the late reverberation part 320 only on the output channels (two output channels in the given example and not all the input channels, which are for example 22 channels), results in a drastically reduced complexity. Further optimizations of the reduced filtering operation (convolution) itself results in even more enhanced performances in terms of computational complexity.

Embodiments of the present disclosure generally relate to an apparatus and a method for estimating an overall mixing time based on at least a first pair of RIRs.

Such apparatus comprises the processing element 305 as shown in FIGS. 4 and 5. Hence the MPEG-H 3D audio decoder 200 shown in FIG. 2 forms apparatus according to an embodiment of the present disclosure or at least comprises such apparatus.

The apparatus, e.g. MPEG-H 3D audio decoder 200, according to an embodiment of the present disclosure comprises the processing element 305 which is configured to perform various functionalities, as will be explained in detail further below. This processing element 305 is for example implemented in or part of a parameterization element as shown in FIG. 5, as a separate processing element. Generally, the processing element 305 of the apparatus is configured to determine differences between energy profiles of a first RIR of the first pair of RIRs and a second RIR of the first pair of RIRs at a plurality of different sample times of the first pair of RIRs. Furthermore, the processing element 305 is configured to set a sample time of the plurality of sample times as a mixing time for the first pair of RIRs at which the difference between the energy profiles of the first RIR and the second RIR of the first pair of RIRs is equal to or below a threshold value, and to determine the overall mixing time based on the mixing time for the first pair of RIRs. The first pair of RIRs or the later described plurality of pairs of RIRs is for example stored in a data base in the MPEG-H 3D audio decoder 200 or in a memory element of the processing element 305. The processing element 305 according to an embodiment of the present disclosure then determines the overall mixing time according to the various embodiments and implementation details explained below.

In the general concept of the mixing time, a sound which is omitted by a source in a room directly reaches the receiver (listener, microphone or the like). This is referred to as the direct path. The direct path sound is followed by some discrete early reflections resulting from low order reflections on the walls of the room. Then the density of the reflection increases until the time, which is called mixing time, when individual reflections become indistinguishable (high reflection density). This was already explained above in relation to FIGS. 2 and 3, but applies identically to the embodiments and implementations of the present disclosure. In an ergodic room, the energy progressively becomes homogeneously defuse in space and time, which means a uniform energy flow through an arbitrary surface in the room and a constant energy density in every position in the room. As a result, for an ergodic room, after the mixing time, the energy flow and density will decay in the same way in any point of the room and thus all impulse responses measured at arbitrary positions in the room will have the same energy decay profile. In other words, ergodic systems have the same behavior averaged over time as averaged over space. The time average of one sequence of events is the same as the average of the ensemble. In real world rooms, the ergodicity assumption typically does not hold and may be limited by a non-uniform distribution of absorption in the room, coupled rooms, very small rooms, proximity to walls, and/or low frequencies modal behavior. However, as the goal of binauralization is to reproduce a pleasant listening experience, common BRIRs used in the binauralization content represent acoustically optimal listening rooms. In such rooms the mentioned limitations typically do not hold. The inventors have found that for estimating the mixing time and practical binauralization applications, ergodicity can be assumed. As a result, it can be assumed that the late reverberation part 320 of a RIR is independent of the position within the room. In other words, based on the ergodicity assumption, it can be said that after the mixing time, the energy profiles will be the same for all RIRs measured at arbitrary positions within the same room.

As mentioned above, embodiments of the present disclosure for estimating an overall mixing time, among other features, are based on a determination of differences between energy profiles of a first RIR and a second RIR of a pair of RIRs at a plurality of different sample times of the pair of RIRs. Hereby, embodiments of the present disclosure advantageously and optionally suggest use of a backward integrated energy difference decay curve for determining said differences between the energy profiles. Such backward integrated EDCs, are also called Schroeder Energy Decay Curve, which is equivalent to averaging several measurements. The main benefit of these curves is that they are always decreasing and smoother than, for example, a squared impulse response which represents the energy at any time instant. As a result, a backward integrated EDC provides a robust energy decay profile estimate.

Given an impulse response h of length P with time index $n \in \{1, \ldots, P\}$, the EDC is defined as the backward integrated energy:

$$EDC[n] = \sum_{k=n}^{P} h^2[k].$$

Following this definition, EDC[1] is the complete energy of the impulse response h.

Figure 6:
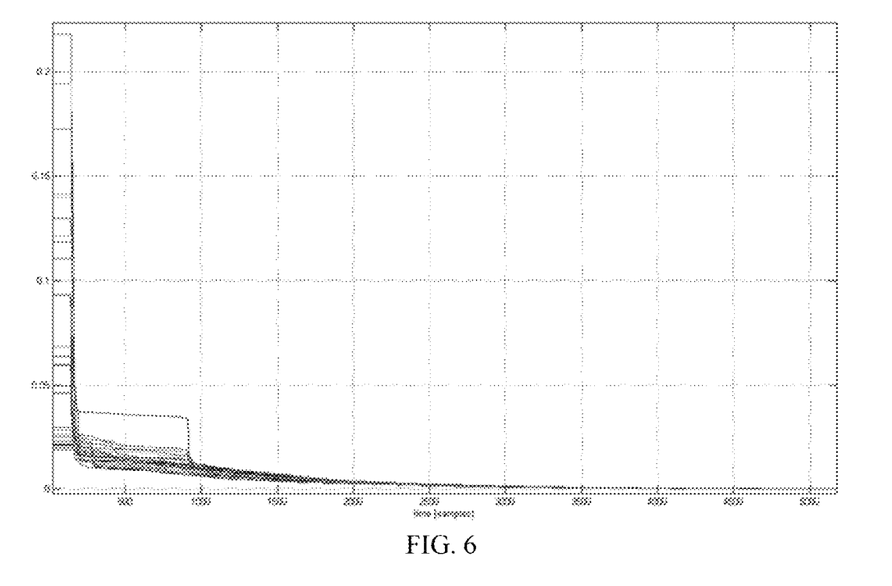
FIG. 6 shows an example for different EDC, for several RIRs recorded at different positions in the same room.

FIG. 6 shows several different examples of such EDCs for a set of impulse responses recorded in the same room. The X-axis defines the time in samples and the Y-axis defines the energy. These curves are an important part of room acoustics, for example the reverberation time is traditionally defined using a threshold on an EDC at for example minus 60 decibel (dB).

As stated above, in ergodic conditions, the EDCs corresponding to 2 or more RIRs measured at different points in a room differ mostly in the early part and are highly similar at the late part. This effect can be observed in FIG. 6, where the EDCs show large variations in the early part and conversions to the same value in the late part. Embodiments of the present disclosure now, in an advantageous and optional implementation, suggests to use DEDCs, for capturing the decay profile of energy differences of RIRs measured at different points in a room as follows.

Given two RIRs $h_1$, $h_2$ of length P samples measured at different points in a room is defined as:

$$DEDC[n] = \sum_{k=n}^{P} dh^2[k] = \sum_{k=n}^{P} |\tilde{h}_1^2[k] - \tilde{h}_2^2[k]|,$$

where $\tilde{h}_x^2$ is a temporally smoothed version of $h_x^2$ and $|\cdot|$ refers to the absolute value.

The case of binaural RIRs can be considered as a special case because the two microphones in the two ears of the dummy head provide two impulse responses $(h_L, h_R)$ at the same time and different position (left ear, right ear). The binaural DEDC (B-DEDC) is defined as:

$$BDEDC[n] = \sum_{k=n}^{P} |\tilde{h}_L^2[k] - \tilde{h}_R^2[k]|.$$

As can be seen from these equations, the DEDC and also the B-DEDC can be seen as a backward integrated energy difference decay curve which captures the decay of the energy difference of two RIRs.

Several measures for computing an energy difference are possible:
Direct energy difference $h_1^2[k] - h_2^2[k]$;
Smoothed energy difference $\tilde{h}_1^2[k] - \tilde{h}_2^2[k]$;
Amplitude difference $|h_1[k]| - |h_2[k]|$; and
Level difference $20 \log(|h_1[k]|) - 20 \log(|h_2[k]|)$ Hereby, the use of a smooth energy difference may be advantageous in view of computational efforts and accuracy of the result of the mixing time.

Figure 7A:
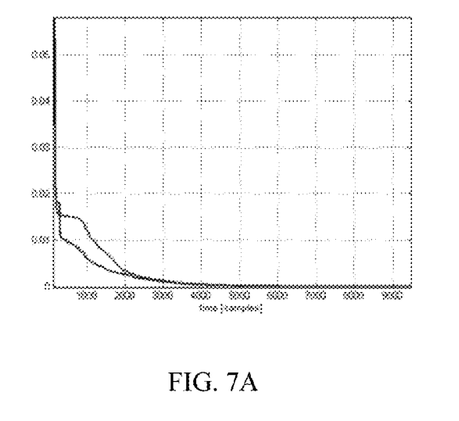
FIG. 7A the EDCs, for two RIRs recorded at different positions in a room.
Figure 7B:
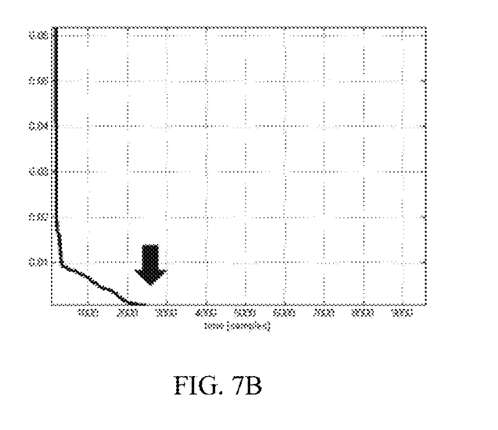
FIG. 7B a corresponding DEDC, for the two RIRs, shown in FIG. 7A.

FIG. 7A shows two EDCs of RIRs measured at different positions in the same room. The X-axis defines the time and the Y-axis defines the energy. Obviously, the differences in the energy decay are mostly located in the early part. Consequently, the resulting DEDC as shown in FIG. 7B exhibits large values in the early part and quickly converges toward zero. The X-axis defines the time in samples and the Y-axis defines the energy. Ideally, the DEDC would be zero after the mixing time. In practice, however, setting a threshold on DEDC, as performed by embodiments of the present disclosure, will deliver the estimated mixing time with a reasonable computational effort and a good and reliable result. Embodiments of the present disclosure suggest searching for the value n for which the DEDC or BDEDC falls below the threshold for a first time. This value n then forms the mixing time. In the example of FIGS. 7A and 7B, the mixing time is expressed in samples, or sample numbers, however, an expression in time units, for example ms, is also possible. In general we speak of a sample time which covers both expressions (in time units and in sample number).

Figure 8:
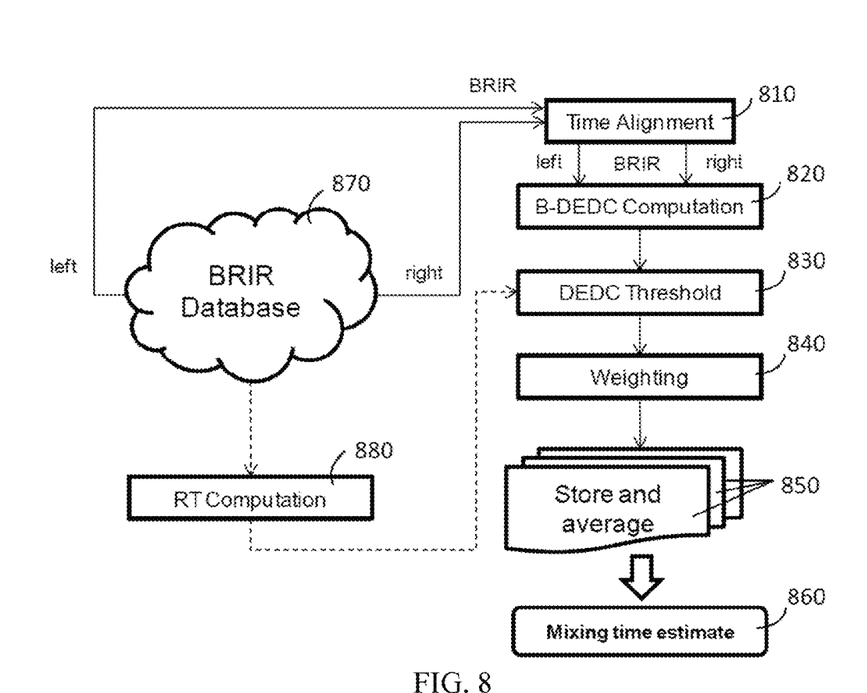
FIG. 8 shows a schematic overview over a flow chart for mixing time estimation for BRIRs as implemented in a binaural renderer according to an embodiment the present disclosure.

FIG. 8 shows a schematic flow chart of a method for estimating the mixing time of a room considering, for example, an N element BRIR corpus, i.e. a set of N BRIRs, measured in the room. For all N BRIRs, the two corresponding responses, i.e. the left and right channels, are time aligned in a first step 810, and subsequently the B-DEDC is computed for each pair in step 820. In order to derive the mixing time from the B-DEDCs, a threshold value is used.

The threshold value can be preset (fixed), or can be adapted and variable according to some properties of the room, for example its reverberation time (RT), which could, in a second option, for example be derived in step 880 from room information in the BRIR database 870. In the example, the room information is the reverberation time; however, other suitable parameters of the room could be used. The sample index or sample time at which the B-DEDC falls below the threshold value is determined as the respective mixing time in step 830 for the evaluated BRIR. The threshold value can e.g. be between (including) −18 dB and −23 dB from the B-DEDC at sample index 1. N mixing times estimates result from this operation (for each BRIR on mixing time estimate is derived). The N mixing times are then averaged and stored in step 850 in order to obtain the overall mixing time of the room in step 860. Optionally, an additional weighting step 840 can be implemented, which gives a weight to each of the pairs. Certain positions in the room can receive a lower or higher weight as they may be less or more reliable. For example, BRIR measurements from sources centered in the front or back of the dummy head (cf. FIG. 1) do not provide reliable estimates. Because the two responses of the BRIR in the left ear and right ear can be considered equal or at least as very similar, also for the early part, the estimate is not reliable. The B-DEDC would be theoretically equal to zero for any time value. Therefore, the weights for BRIRs corresponding to centered positions may be set to zero in step 840.

Figure 9:
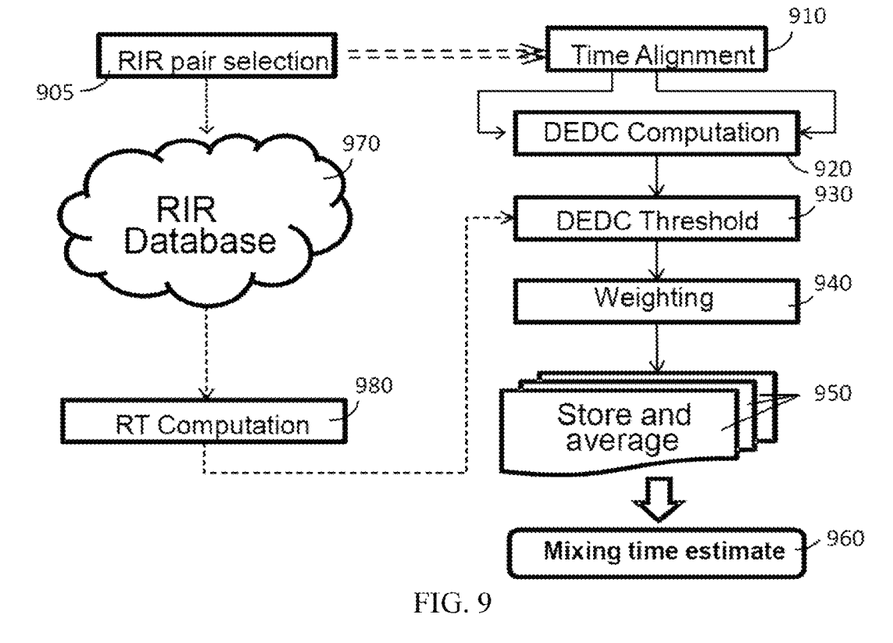
FIG. 9 shows a schematic flow chart of a method for mixing time estimation for a plurality of RIR pairs as implemented in a renderer according to an embodiment of the present disclosure.

FIG. 9 shows a flow chart of the method for estimating the mixing time of a room considering, for example, a 2N element RIR corpus measured in a room according to an embodiment of the present disclosure. In a first step 905, two RIRs are selected from the RIR database 970, then the responses are time aligned in step 910 and subsequently the DEDC is computed for each pair in step 920. In order to derive the mixing times from the DEDCs in step 930, a threshold value is set, which can be fixed or adapted to some properties of the room, for example its RT in step 980, in the same way as described in relation to step 880 of FIG. 8. The threshold value can e.g. be between (including) −18 dB and −23 dB from the DEDC (of the chosen pair) at sample index 1. The sample index or sample time at which the DEDC falls below the threshold value is determined as the respective mixing time in step 930. N mixing times estimates may result from this operation in step 930. The mixing times are than averaged stored in step 950 in order to obtain the final or overall mixing time of the room in step 960. For this step, optionally weighted averages can be computed by giving a weight to the pairs in a step 940. For example, certain positions in the room can achieve a lower or higher weight as they may be less or more reliable. Similar considerations to the ones made in relation to FIG. 8 hold about weighting for two closely measured RIRs or two RIRs measured in positions symmetrical with respect to the room geometry. The RIR pair selection module performing the RIR section in step 905 may include a smart selection procedure that optimizes the choice considering the effective information conveyed by the considered pair. As an example the pair of RIRs can be chosen such that the RIRs in the plurality are combined into pair of RIRs which (probably) have the highest differences in their energy profiles. This selection of RIR pairs can be based, as also the weighting is on metadata of the single RIRs. The metadata indicating a mutual relationship between a source and a receiver used for deriving the associated RIR.

It has to be noted that the various steps shown in and explained in relation to the flow charts of FIGS. 8 and 9 can be implemented by respective functional entities or elements in the processing element 305. In a most simple embodiment of the present disclosure, the overall mixing time is derived only from a first pair of RIRs. In this simple embodiment the overall mixing time, equals the mixing time estimated for the first pair of RIRs.

According a further embodiment of the present disclosure, the DEDCs or the B-DEDCs can also be computed from a sub-band representation. Hereby, the processing element 305 is configured to determine the differences between the energy profiles of the first RIR and the second RIR at the plurality of different sample times for a plurality of sub-band partitions of the first pair of RIRs. Furthermore, the processing element 305 is configured to separately for each sub-band partition set the sample time of the plurality of sample times as the mixing time for the corresponding sub-band partition at which the difference between the energy profiles of the first RIR and the second RIR for the respective sub-band partition is equal to or below a threshold value. Furthermore, the processing element 305 is configured to determine the overall mixing time based on the mixing times for the plurality of sub-band partitions.

In this case, the RIRs k, $h_2$ of a pair of impulse responses (BRIR or chosen in step 905) are first split into B frequency subbands $h^b_1$, $h^b_2$, $b \in \{1, \ldots, B\}$ using e.g., a filter bank. Then, a mixing time estimate is derived for each subband $h^b_1$, $h^b_2$ yielding B subband mixing time estimates.

Based on the subband mixing time estimates the overall mixing time can be estimated.

Figure 10:
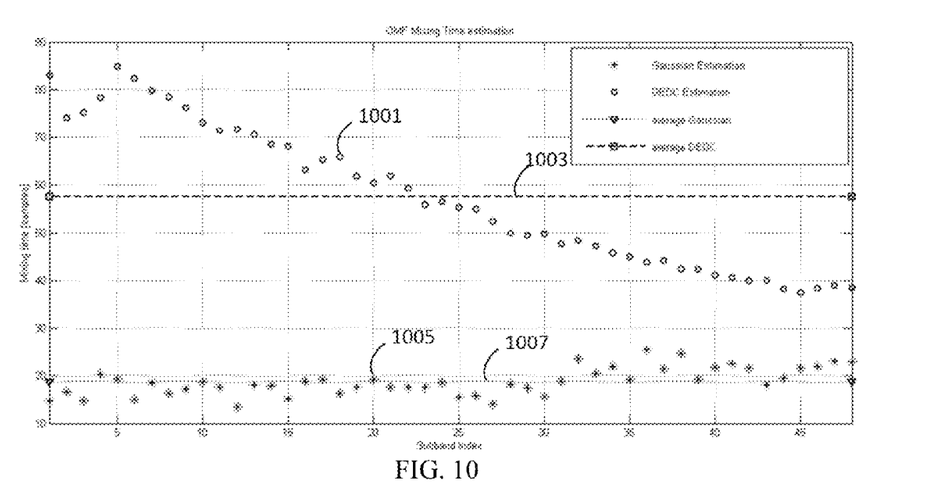
FIG. 10 is an example diagram comparing the estimation of mixing times using embodiments of the present disclosure and a conventional approach for sub-band processing.

From FIG. 10 in which the X-axis defines the subband index and the Y-axis defines the estimated mixing time in samples, it can be seen the concept described in the present application is also robust dealing with subband-down sampled responses such as the ones provided by the quadrature mirror filter (QMF) interface of MPEG-H decoder FIG. 10 show the subband mixing estimated time values in case of the usually considered 48 first QMF subbands are shown in compared with the results of a Gaussian estimator.

FIG. 10 illustrates the increased robustness of the described concept due to the monotonic behavior of the estimation metric DEDC. Traditional statistical approaches, such as the Gaussian approach are much more instable. In particularly for the above described sub-band down sampled representations, for example by means of a QMF filter bank, as reflected in FIG. 10, this increased robustness is rather remarkable.

In FIG. 10, circle markers 1001 correspond to the subband mixing time values derived from B-DEDC averaged over 28 BRIRs. The straight traits line 1003 corresponds to the subband average for the B-DEDC. Star markers show 1005 subband mixing time values (the dotted straight line 1007 represent their average) derived using the conventional Gaussian approach. As can be seen, the B-DEDC much better reflects the physical behavior of longer mixing times for low frequencies and short mixing times for high frequencies.

Figure 11:
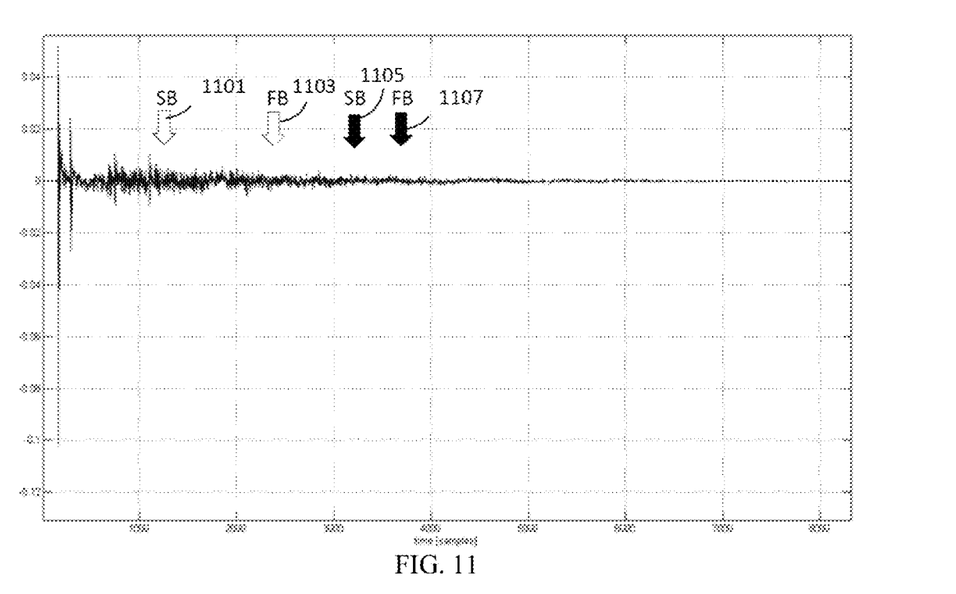
FIG. 11 shows another schematic diagram comparing the estimation of mixing times using embodiments of the present disclosure and a conventional approach.

FIG. 11 shows several mixing time estimates for a given BRIR, used in MPEG context. The X-axis defines the time in samples and the Y-axis defines the amplitude. A mixing time of 3800 samples (~80 ms) as provided by the DEDC is obtained by visual inspection and generally accepted for this room.

FIG. 11 shows a first white arrow 1101 which corresponds to the mixing time estimation using the Gaussian estimation in subband (SB), context and a second white arrow 1103 which corresponds to the mixing time estimation using the Gaussian estimation in fullband (FB), context. For the Gaussian estimation in subband clearly one main reflection is not taken into account. Furthermore, the Gaussian result is not consistent for FB, and SB, domain (the two white arrows differ quite a lot).

Furthermore FIG. 11 shows a first black arrow 1105 which corresponds to the mixing time estimation using embodiments of the present disclosure (based on the DEDCs) in SB, context and a second black arrow 1107 which corresponds to the mixing time estimation using embodiments of the present disclosure in FB, context.

The mixing time derived from the DEDCs (black arrows 1105, 1107) according to embodiments of the present disclosure is more robust and consistent in the 2 contexts, due to the monotonic behavior of the DEDC and is much closer to the expected value for the mixing time of 3800 samples as derived from the visual inspection.

The present disclosure has been described in conjunction with various embodiments as examples as well as implementations. However, other variations can be understood and effected by those skilled in the art in practicing the claimed disclosure, from the study of the drawings, the disclosure and the independent claims. In the claims as well as in the description, the word "comprising" does not exclude other elements or steps and the indefinite article "a" or "an" does not exclude a plurality. A single element or other unit may fulfill the functions of several entities or items defined in the claims. The mere fact that certain measures are cited in mutual different claims does not indicate that a combination of these measures cannot be used in an advantageous implementation.

What is claimed is:

1. An apparatus for estimating an overall mixing time based on at least a first pair of room impulse responses, comprising:
   a memory comprising instructions; and
   a processor coupled to the memory, wherein the instructions cause the processor to be configured to:
      determine differences between energy profiles of a first room impulse response of the first pair of room impulse responses and a second room impulse response of the first pair of room impulse responses at a plurality of different sample times of the first pair of room impulse responses;
      set a sample time of the plurality of different sample times as a mixing time for the first pair of room impulse responses at which the difference between the energy profiles of the first room impulse response and the second room impulse response of the first pair of room impulse responses is equal to or below a threshold value; and
      determine the overall mixing time based on the mixing time for the first pair of room impulse responses,
   wherein the apparatus is configured to estimate the overall mixing time based on a plurality of pairs of room impulse responses,
   wherein the first pair of room impulse responses is comprised in the plurality of pairs of room impulse responses, and
   wherein the instructions further cause the processor to be configured to:
      determine, for each pair of room impulse responses of the plurality of pairs of room impulse responses, differences between energy profiles of a first room impulse response and of a second room impulse response of the respective pair of room impulse responses at a plurality of different sample times of the respective pair of room impulse responses;
      set, for each pair of room impulse responses of the plurality of pairs of room impulse responses, a sample time of the plurality of different sample times as a mixing time for the respective pair of room impulse responses at which the difference between the energy profiles of the first room impulse response and the second room impulse response of the respective pair of room impulse responses is equal to the threshold value; and
      determine the overall mixing time based on the mixing times of each of the plurality of room impulse responses.

2. The apparatus according to claim 1, wherein the instructions further cause the processor to be configured to determine the overall mixing time based on an averaging over the mixing times of the plurality of pairs of room impulse responses.

3. The apparatus according to claim 1, wherein the instructions further cause the processor to be configured to:
   weight at least a part of the plurality of pairs of room impulse responses with the determined mixing times; and
   determine the overall mixing time based on the weighted mixing times.

4. The apparatus according to claim 3, wherein the instructions further cause the processor to be configured to weight the mixing time of each pair of room impulse responses of the part of the plurality of room impulse response based on first meta data associated to the first room impulse response of the respective pair of room impulse responses and based on second meta data associated to the second room impulse response of the respective pair of room impulse responses, wherein the first meta data indicates a mutual relationship between a source and a receiver used for deriving the associated first room impulse response, and wherein the second meta data indicates a mutual relationship between a source and a receiver used for deriving the associated second room impulse response.

5. The apparatus according to claim 1, wherein the instructions further cause the processor to be configured to calculate a backward integrated energy difference decay curve for determining the differences between the energy profiles.

6. The apparatus according to claim 5, wherein the instructions further cause the processor to be configured to use a smoothed energy difference for calculating the backward integrated energy difference decay curve.

7. The apparatus according to claim 5, wherein the instructions further cause the processor to be configured to use a direct energy difference for calculating the backward integrated energy difference decay curve.

8. The apparatus according to claim 5, wherein the instructions further cause the processor to be configured to use an amplitude difference for calculating the backward integrated energy difference decay curve.

9. The apparatus according to claim 5, wherein the instructions further cause the processor to be configured to use a level difference for calculating the backward integrated energy difference decay curve.

10. The apparatus according to claim 1, wherein the instructions further cause the processor to be configured to derive the difference between the energy profiles of the first room impulse response and the second room impulse response such that the difference is calculable by the expression $$DEDC[n] = \sum_{k=n}^{P} dh^2[k] = \sum_{k=n}^{P} |\tilde{h}_1^2[k] - \tilde{h}_2^2[k]|,$$

wherein DEDC[n] is the difference between the energy profiles of the first impulse response and the second impulse response at sample time n, wherein $\tilde{h}_x^2$ is a temporally smoothed version of $h_x^2$, wherein |•| refers to the absolute value, wherein $h_1[k]$ is a value of a first room impulse response at sample time k, wherein $h_2[k]$ is a value of a second room impulse response at sample time k, and wherein P is the length of the room impulse responses of the first pair room impulse responses.

11. The apparatus according to claim 1, wherein the instructions further cause the processor to be configured to determine the first pair of room impulse responses out of a corpus of available room impulse responses based on first meta data associated to the first room impulse response and second meta data associated to the second room impulse response, wherein the first meta data indicating a mutual relationship between a source and a receiver used for deriving the first room impulse response, and wherein the second meta data indicating a mutual relationship between a source and a receiver used for deriving the second room impulse response.

12. The apparatus according to claim 1, wherein the instructions further cause the processor to be configured to:
determine the differences between the energy profiles of the first room impulse response and the second room impulse response at the plurality of different sample times for a plurality of sub-band partitions of the first pair of room impulse responses;
separately set the sample time of the plurality of different sample times as the mixing time for the corresponding sub-band partition at which the difference between the energy profiles of the first room impulse response and the second room impulse response for the respective sub-band partition is equal to the threshold value for each sub-band partition; and
determine the overall mixing time based on the mixing times for the plurality of subband partitions.

13. The apparatus according to claim 1, wherein the instructions further cause the processor to be configured to:
determine the differences between the energy profiles of the first room impulse response and the second room impulse response at the plurality of different sample times for a plurality of sub-band partitions of the first pair of room impulse responses;
separately set the sample time of the plurality of different sample times as the mixing time for the corresponding sub-band partition at which the difference between the energy profiles of the first room impulse response and the second room impulse response for the respective sub-band partition is below the threshold value for each sub-band partition; and
determine the overall mixing time based on the mixing times for the plurality of subband partitions.

14. The apparatus according to claim 1, wherein the threshold value is predetermined.

15. The apparatus according to claim 1, wherein the instructions further cause the processor to be configured to derive the threshold value based on meta data associated to the first pair of room impulse responses, and wherein the meta data indicates at least a property of a room based on which the first pair of room impulse responses were derived.

16. An apparatus for estimating an overall mixing time based on at least a first pair of room impulse responses, comprising:
a memory comprising instructions; and
a processor coupled to the memory, wherein the instructions cause the processor to be configured to:
determine differences between energy profiles of a first room impulse response of the first pair of room impulse responses and a second room impulse response of the first pair of room impulse responses at a plurality of different sample times of the first pair of room impulse responses;
set a sample time of the plurality of different sample times as a mixing time for the first pair of room impulse responses at which the difference between the energy profiles of the first room impulse response and the second room impulse response of the first pair of room impulse responses is equal to or below a threshold value; and
determine the overall mixing time based on the mixing time for the first pair of room impulse responses,
wherein the apparatus is configured to estimate the overall mixing time based on a plurality of pairs of room impulse responses,
wherein the first pair of room impulse responses is comprised in the plurality of pairs of room impulse responses, and
wherein the instructions further cause the processor to be configured to:
determine, for each pair of room impulse responses of the plurality of pairs of room impulse responses, differences between energy profiles of a first room impulse response and of a second room impulse response of the respective pair of room impulse responses at a plurality of different sample times of the respective pair of room impulse responses;
set, for each pair of room impulse responses of the plurality of pairs of room impulse responses, a sample time of the plurality of different sample times as a mixing time for the respective pair of room impulse responses at which the difference between the energy profiles of the first room impulse response and the second room impulse response of the respective pair of room impulse responses is below the threshold value; and
determine the overall mixing time based on the mixing times of each of the plurality of room impulse responses.

17. An apparatus for estimating an overall mixing time based on at least a first pair of room impulse responses, comprising:
a memory comprising instructions; and
a processor coupled to the memory, wherein the instructions cause the processor to be configured to:
determine differences between energy profiles of a first room impulse response of the first pair of room impulse responses and a second room impulse response of the first pair of room impulse responses at a plurality of different sample times of the first pair of room impulse responses;
set a sample time of the plurality of different sample times as a mixing time for the first pair of room impulse responses at which the difference between the energy profiles of the first room impulse response and the second room impulse response of the first pair of room impulse responses is equal to or below a threshold value;

determine the overall mixing time based on the mixing time for the first pair of room impulse responses; and derive the difference between the energy profiles of the first room impulse response and the second room impulse response such that the difference is calculable by the expression $$DEDC[n] = \sum_{k=n}^{P} dh^2[k] = \sum_{k=n}^{P} |\tilde{h}_1^2[k] - \tilde{h}_2^2[k]|,$$

wherein DEDC[n] is the difference between the energy profiles of the first impulse response and the second impulse response at sample time n, wherein $\tilde{h}_x^2$ is a temporally smoothed version of $h_x^2$, wherein |•| refers to the absolute value, wherein h1 [k] is a value of a first room impulse response at sample time k, wherein h2[k] is a value of a second room impulse response at sample time k, and wherein P is the length of the room impulse responses of the first pair room impulse responses.

* * * * *